(12) United States Patent
Sharma

(10) Patent No.: US 8,656,292 B2
(45) Date of Patent: Feb. 18, 2014

(54) ACCENTUATED GRAPHICAL USER INTERFACE

(75) Inventor: Neeraj S. Sharma, New Dehli (IN)

(73) Assignee: International Business Machines Corporation, Armonk, NY (US)

(*) Notice: Subject to any disclaimer, the term of this patent is extended or adjusted under 35 U.S.C. 154(b) by 385 days.

(21) Appl. No.: 13/051,526

(22) Filed: Mar. 18, 2011

(65) Prior Publication Data
US 2011/0167367 A1 Jul. 7, 2011

Related U.S. Application Data

(62) Division of application No. 11/693,173, filed on Mar. 29, 2007, now Pat. No. 7,954,060.

(51) Int. Cl.
*G06F 3/048* (2013.01)
*G06F 3/00* (2006.01)
*G06F 15/173* (2006.01)

(52) U.S. Cl.
USPC .......................... 715/765; 709/224; 715/751

(58) Field of Classification Search
USPC .................................. 715/765, 751; 709/224
See application file for complete search history.

(56) References Cited

U.S. PATENT DOCUMENTS

| | | | |
|---|---|---|---|
| 6,330,005 B1 * | 12/2001 | Tonelli et al. | 715/735 |
| 6,754,885 B1 | 6/2004 | Dardinski et al. | |
| 6,966,033 B1 | 11/2005 | Gasser et al. | |
| 7,437,676 B1 * | 10/2008 | Magdum et al. | 715/738 |
| 7,594,220 B2 | 9/2009 | Kodosky et al. | |
| 7,711,813 B1 | 5/2010 | Yehuda et al. | |
| 7,930,649 B2 * | 4/2011 | Mysore et al. | 715/804 |
| 7,954,060 B2 * | 5/2011 | Sharma | 715/765 |
| 2004/0085345 A1 * | 5/2004 | Galou et al. | 345/734 |
| 2004/0243945 A1 * | 12/2004 | Benhase et al. | 715/853 |
| 2006/0106861 A1 | 5/2006 | Torgerson et al. | |
| 2008/0077874 A1 | 3/2008 | Garbow et al. | |

FOREIGN PATENT DOCUMENTS

| | | |
|---|---|---|
| WO | WO 9857260 | 12/1998 |
| WO | WO 2004095267 | 11/2004 |
| WO | WO 2005066771 | 7/2005 |

OTHER PUBLICATIONS http//:www.isis.Nanderbilit.edu/publications/archive/Ledeczi_A_12_182001_GME_2000_U_.pdf GME 2000 User's Manual, Dec. 18, 2001.

\* cited by examiner

*Primary Examiner* — David Phantana Angkool
(74) *Attorney, Agent, or Firm* — Hamilton, Brook, Smith & Reynolds, P.C.

(57) ABSTRACT

A graphical user interface in which entities of the interface are manipulated using manipulation operations. The graphical user interface comprises a selectable interface entity upon which manipulation operations are commence-able, a first interface entity distinct from the selectable interface entity, and a second interface entity distinct from the first interface entity and the selectable interface entity. Upon commencement of a manipulation operation on the selectable interface entity, at least one of the first interface entity and the second interface entity is visually accentuated.

19 Claims, 8 Drawing Sheets

ACCENTUATED GRAPHICAL USER INTERFACE

RELATED APPLICATION(S)

This application is a divisional of U.S. application Ser. No. 11/693,173, filed Mar. 29, 2007. The entire teachings of the above application(s) are incorporated herein by reference.

FIELD OF THE INVENTION

This invention relates generally to computer displays and graphical user interfaces, and more specifically to a graphical user interface, system and method for accentuating entities of a graphical user interface.

BACKGROUND OF THE INVENTION

Computer systems use a variety of user interface methods to display and manipulate information. An important consideration in computer systems is their ease of use and the intuitiveness of their user interface. Most popular computer systems today use a graphical user interface (GUI) on a computer display to interact with a user.

Typically, in GUIs, operations on objects of a computer system, such as files and folders, are performed by manipulating one or more icons displayed by the GUI. In this manner, the objects are moved, copied, deleted, renamed, and so forth. A common means of manipulating the icons of a GUI is by a manipulation operation known as a drag-and-drop operation. A drag-and-drop operation involves selecting an icon and, while keeping the icon selected, changing the spatial position of the icon in the GUI. Commonly, this is realized with a pointing device, such as a mouse, by clicking a button of the mouse on an icon, and keeping the button depressed while moving the mouse so as to 'drag' the icon to a new spatial position in the GUI.

Manipulation operations, such as the drag-and-drop operation, often involve a number of other icons, or portions of the GUI, in addition to a selected icon. In the case of the drag-and-drop operation described above, a 'drop target' is usually involved. The 'drop target' is the final position to which the selected icon will be dragged, and is commonly another icon, a window, 'empty' space in the GUI, a toolbar, and the like. The drag-and-drop operation is completed by dropping the selected icon on the 'drop target'.

With present GUIs, it is not readily apparent to a user what the possible 'drop targets' for the selected icon are. Even after a drag-and-drop operation has commenced after selection of an icon, the available valid 'drop targets' are not made known to the user for the selected icon. A disadvantage is that, the user is required to rely on trial-and-error to determine what targets are considered to be valid 'drop targets', and if the drag-and-drop operation is even applicable to the selected icon. A further disadvantage is that the user has no way of readily ascertaining what the result of a drag-and-drop operation will be. For example, there is no indication to a user if a drag-and-drop operation performed on an icon will result in the icon being moved or copied.

Accordingly, it would be advantageous to provide an improved GUI, capable of providing the user with better guidance for any GUI based operations.

SUMMARY OF THE INVENTION

According to a first aspect of the invention is a graphical user interface for a display device in which entities of the interface are manipulated by manipulation operations. The graphical user interface comprises a selectable interface entity upon which manipulation operations are operable, a first interface entity other than the selectable interface entity, and a second interface entity other than the selectable interface entity and the first interface entity, wherein upon commencement of a manipulation operation on the selectable interface entity, at least one of the first interface entity and the second interface entity is accentuated to indicate a relationship thereof with respect to the selectable interface entity and the commenced manipulation operation.

According to a further aspect of the invention is a method of accentuating a graphical user interface for a display device. The method comprises detecting the commencement of a manipulation operation on an entity of the graphical user interface, determining which entities out of a plurality of entities of the graphical user interface are valid participants in the detected manipulation operation, and accentuating the plurality of entities of the graphical user interface such that the entities which are valid participants are visually distinct from the entities which are not valid participants.

According to a further aspect of the invention is a computer system having a graphical user interface on which a user performs manipulation operations so as to interact with the computer system. The computer system comprises a manipulation operation observer for detecting the commencement of a manipulation operation on an entity of the graphical user interface by the user, a participant finder for listing entities of the graphical user interface that can participate in the detected manipulation operation, a validity checker for determining which of the entities listed by the participant finder can validly participate in the detected manipulation operation, and an accentuating mechanism for accentuating one or more of the entities listed by the participant finder such that entities that can validly participated in the detected manipulation operation are visually distinct from entities that cannot validly participate in the detected manipulation.

According to a further aspect of the invention is a computer program product for accentuating a graphical user interface for a display device comprising a program (code) for detecting when a manipulation operation is commenced on an entity of the graphical user interface, said program for determining which entities out of a plurality of entities of the graphical user interface are valid participants in the detected manipulation operation, and said program for accentuating the plurality of entities of the graphical user interface such that the entities which are valid participants are visually distinct from the entities which are not valid participants.

According to a further aspect of the invention, a computer data signal is embodied as a carrier wave operable to cause a computer to execute a graphical user interface accentuating process comprising the steps of detecting the commencement of a manipulation operation on an entity of the graphical user interface, determining which entities out of a plurality of entities of the graphical user interface are valid participants in the detected manipulation operation, and accentuating the plurality of entities of the graphical user interface such that the entities which are valid participants are visually distinct from the entities which are not valid participants.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Some aspects of one or more embodiments of the present invention will now be described with reference to the drawings, in which.

DETAILED DESCRIPTION OF THE INVENTION

A description of example embodiments of the invention follows.

Overview

This invention accentuates related entities such as icons representing files, folders or devices, or portions of a GUI, and the like, in response to the commencement of a manipulation operation on a selectable interface entity of the GUI. According to embodiments of the invention, entities/portions of a GUI that can participate in the commenced manipulation operation are accentuated when the manipulation operation is commenced on the selectable interface entity. In this manner, it is possible to convey to the user information such as: which entities/portions of the GUI are valid participants of the commenced manipulation operation, whether the commenced manipulation operation is applicable to the selected interface entity, what the commenced manipulation operation can result in, and the like.

Examples of manipulation operations include drag-and-drop operations, re-sizing operations, re-naming operations, highlighting operations, and so forth as known to those skilled in the art.

The disclosed embodiments are described in relation to a computer system 100 (FIG. 1A) as one exemplary implementation and application of the invention. It is to be appreciated, however, that the present invention is not limited to such an application and that it is readily envisaged that the present invention find application in any other computer or operating systems such as a complicated multi-user computing apparatus, a single user workstation, an embedded control system, handheld devices such as a PDA or mobile phone, and the like. Indeed, it is envisaged that the present application be applicable in any situation in which a user of a device works with a graphical user interface supporting manipulation operations of interface entities within the GUI.

Figure 1A:
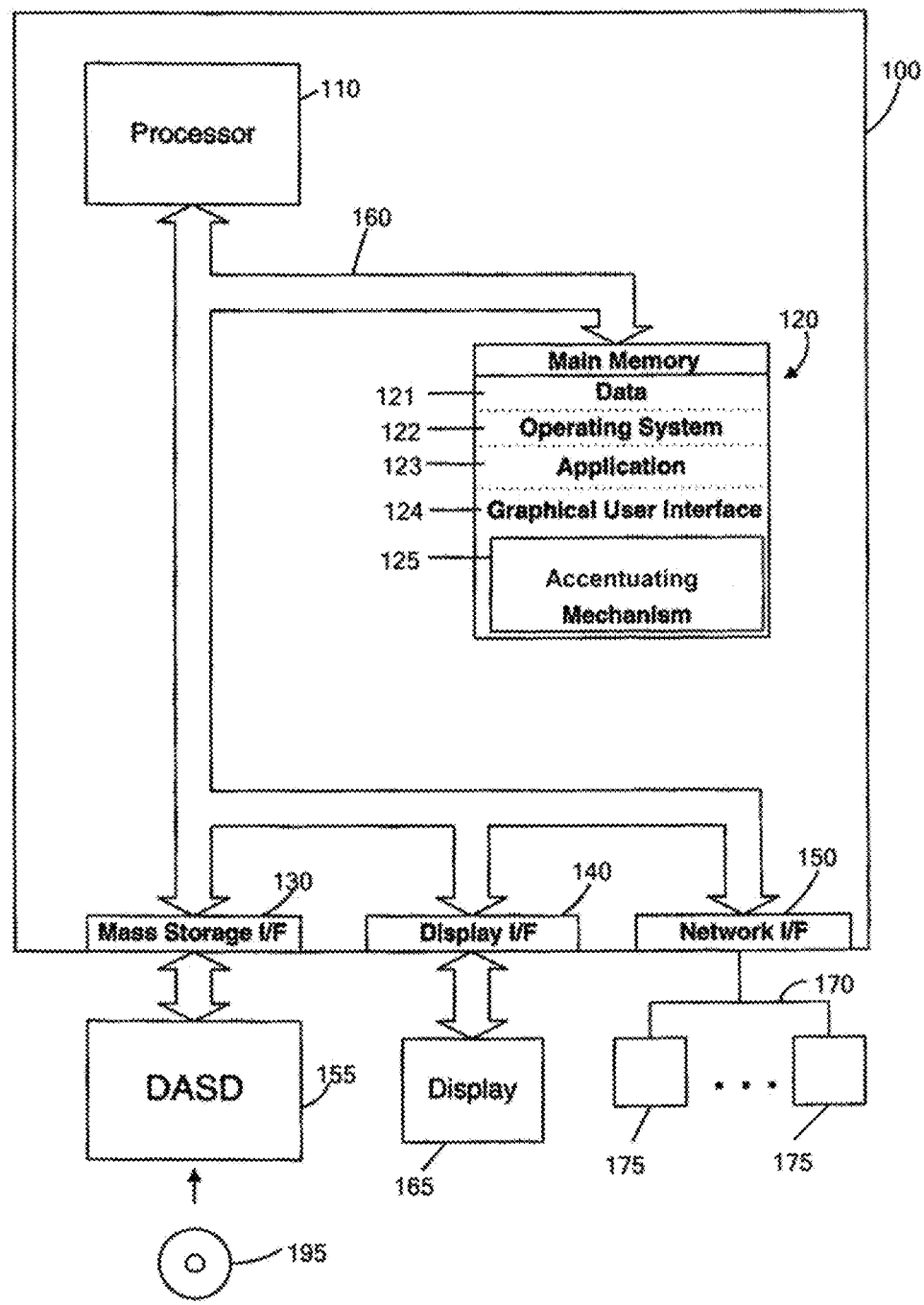
FIG. 1A is a block diagram of a computer apparatus according to embodiments of the present invention.

In the disclosed embodiments, the computer system 100 is exemplified as an IBM™ eServer™ iSeries™ computer system. As shown in FIG. 1A, the computer system 100 comprises a processor 110, a main memory 120, a mass storage interface 130, a display interface 140, and a network interface 150. These system components are interconnected through the use of a system bus 160. The mass storage interface 130 is used to connect mass storage devices, such as a direct access storage device 155, to the computer system 100. One specific type of direct access storage device 155 is a readable and writable CD-RW drive, which may store data to and read data from a CD-RW 195.

The main memory 120 contains data 121, an operating system 122, an application program 123 and a graphical user interface 124. The data 121 represents any data that serves as input to or output from any program in the computer system 100. The operating system 122 is a multitasking operating system known in the industry as i5/OS™, however, those skilled in the art will appreciate that the spirit and scope of this invention is not limited to any one operating system. The application 123 may be any software application, and the graphical user interface 124 can be part of the operating system 122 or part of the application program 123. The computer system 100 includes a related user interface control accentuating mechanism 125.

The computer system 100 utilizes known virtual addressing mechanisms to allow the programs of the computer system 100 to behave as if they only have access to a large, single storage entity, instead of access to multiple, smaller storage entities such as the main memory 120 and direct access storage device (DASD) 155. Therefore, while the data 121, the operating system 122, the application 123, and the graphical user interface 124 are shown to reside in the main memory 120, those skilled in the art will recognize that these items are not necessarily all completely contained in the main memory 120 simultaneously. It should also be noted that the term "memory" is used herein to generically refer to the entire virtual memory of the computer system 100, and may include the virtual memory of other computer systems coupled to the computer system 100.

The network interface 150 is used to connect other computer systems and/or workstations (e.g., 175 in FIG. 1A) to the computer system 100 across a network 170. The network interface 150 within the computer system 100 allows the computer system 100 to engage in cooperative processing with one or more other computer systems or workstations on the network 170. The network interface 150 allows the programs and data shown in the main memory 120 to not necessarily all reside on the computer system 100. For example, one or more portions shown in the main memory 120 may reside on another system and engage in cooperative processing with one or more objects or programs that reside on the computer system 100. This cooperative processing could be accomplished through use of known client-server mechanisms such as remote procedure call (RPC).

The display interface 140 is used to directly connect one or more display devices (displays) 165 to the computer system 100. These displays 165, which may be non-intelligent (i.e., dumb) terminals or fully programmable workstations, are used to allow system administrators and users to communicate with the computer system 100. Note, however, that while the display interface 140 is provided to support communication with one or more displays 165, the computer system 100 does not necessarily require a display 165, because all needed interaction with users and other processes may occur via a network interface 150.

Figure 1B:
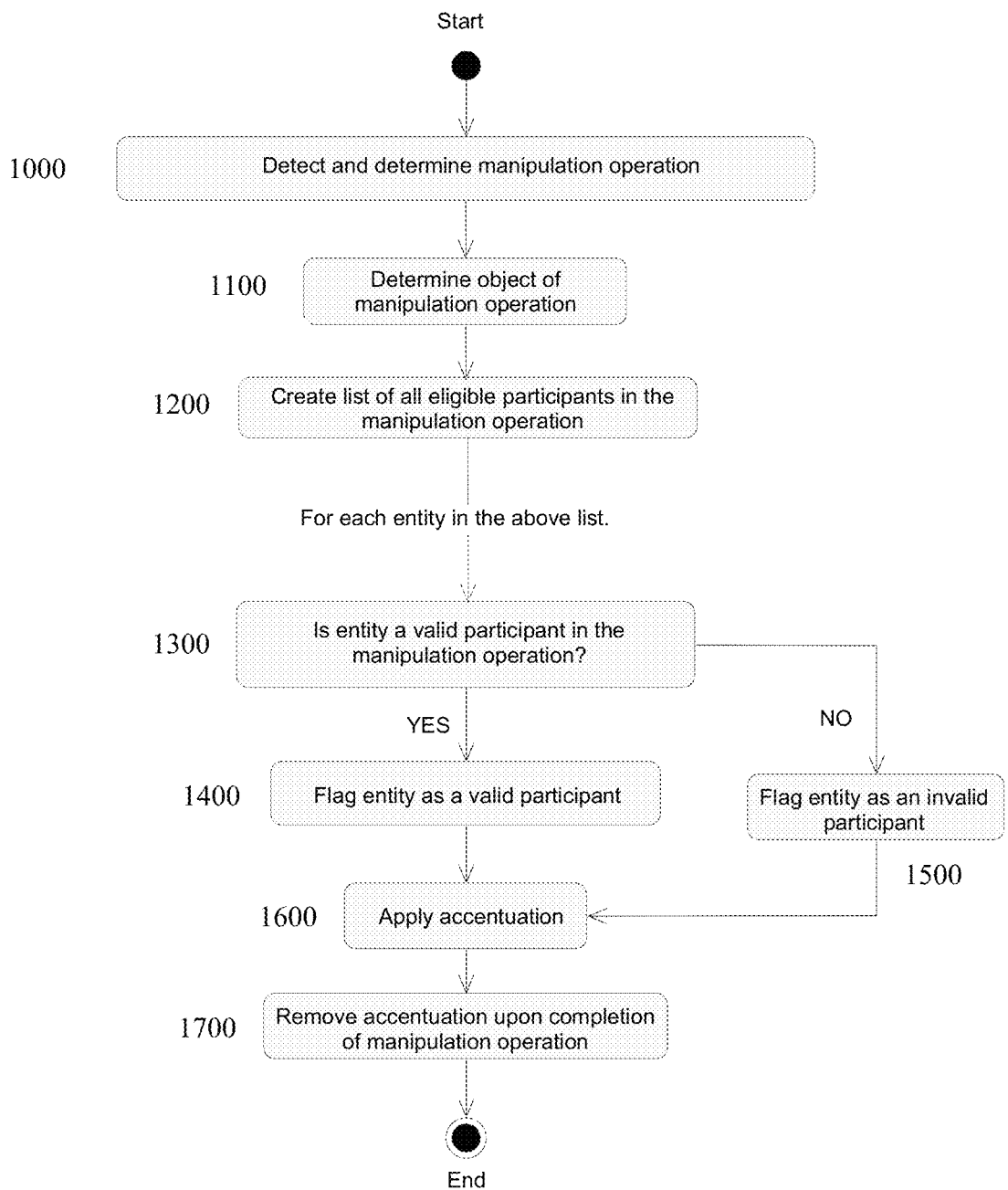
FIG. 1B illustrates an operation of the computer apparatus of FIG. 1A.

The accentuating mechanism 125 is used to determine which interface entities of the GUI should be accentuated, and how they are accentuated. The accentuating mechanism 125 may be realised as specific hardware, and/or program (software) such as sequence of instructions, code or modules executed on the processor 110. FIG. 1B illustrates an exemplary embodiment of an operation of the accentuating mechanism 125. The operation of the accentuating mechanism 125 shown in FIG. 1B occurs upon selection of a selectable interface entity of the graphical user interface, and a commencement of the manipulation operation thereon.

The accentuating mechanism 125 first detects the commencement of a manipulation operation, and determines what manipulation operation is being performed (block 1000). This could be, for example, a drag-and-drop operation. The selectable interface entity that is the object of the manipulation operation is also determined (block 1100). In the example of a drag-and-drop operation, the object of the manipulation operation is the selectable interface entity that is selected and being dragged-and-dropped.

Upon determining the object of the manipulation operation, and what manipulation operation is being commenced, the accentuating mechanism 125 makes a list of all other interface entities of the GUI eligible to participate in the determined manipulation operation already being commenced (block 1200). For each entity in the list, it is then determined if the entity is a valid or non-valid participant in the determined manipulation operation (blocks 1300-1500). Accentuation is performed on either (or both) the participants flagged as "valid" and "invalid", so as to distinguish "valid" participants from "invalid" participants (block 1600). Upon completion of the manipulation operation, the accentuation applied to the entities is removed (block 1700).

Figure 1C:
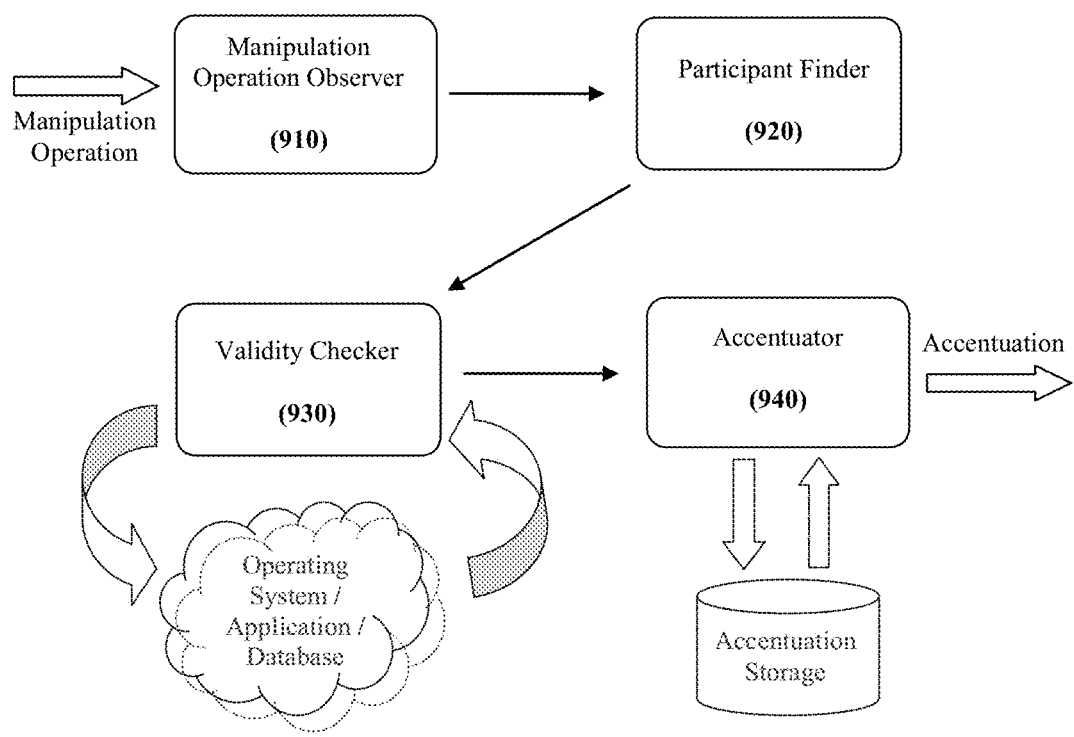
FIG. 1C illustrates the accentuating mechanism of FIG. 1A realized as a program module executed by a processor.

FIG. 1C shows a block diagram of the accentuating mechanism 125 realized as for example a program module, and executable by the processor 110. The program module includes a manipulation operation observer sub-module 910, a participant finder sub-module 920, a validity checker sub-module 930, and an accentuator sub-module 940. The manipulation observer sub-module 910 receives a notification from the computer system 100 on commencement of a manipulation operation. The notification may be by way of polling, interrupts, or other known notification methods. Upon reception of a notification, the participant finder sub-module 920 is invoked to determine which entities of the user interface may participate in the commenced manipulation operation. From the entities determined by the participant finder sub-module 920, the validity checker sub-module 930 determines which of such entities may validly participate in the commenced manipulation operation. Determination of which entities may validly and invalidly participate may be made by, for example, querying the operating system, application 123, or a database internal or external to the computer system 100. The accentuator sub-module 940 accentuates entities to visually distinguish between entities which could be a participant in the commenced manipulation operation from those that cannot. The accentuator sub-module 940 also accentuates entities to distinguish between entities that may validly participate in the commenced manipulation operation from those entities that may not validly participate therein.

The program module shown in FIG. 1C may alternatively be implemented as hardware in the form of distinct hardware modules and/or integrated electronic components.

First Embodiment

Figure 2:
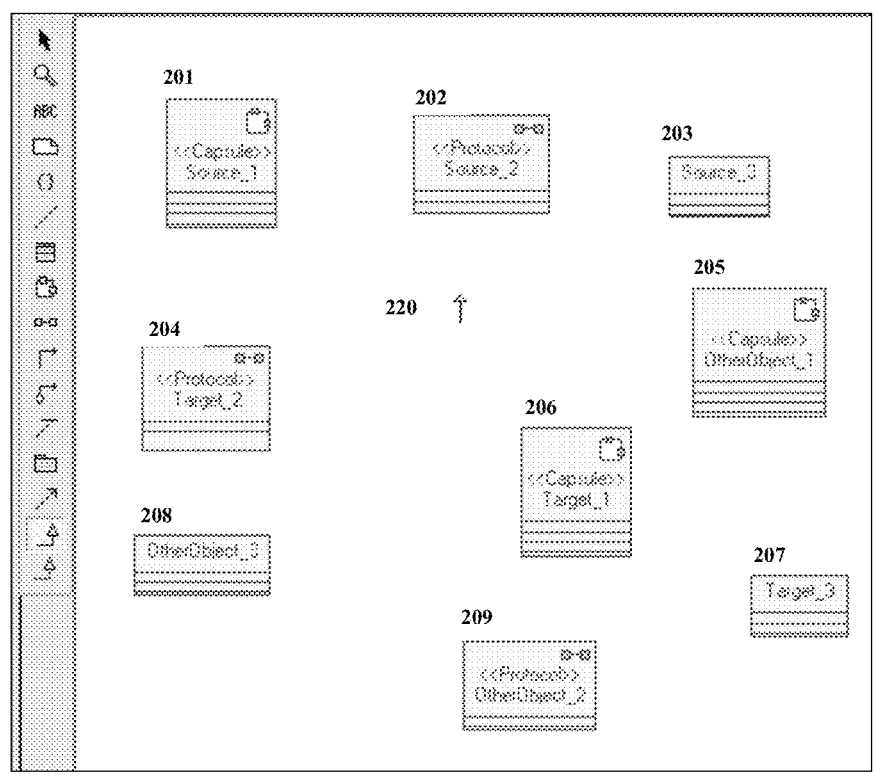
FIG. 2 represents a windows application with a graphical user interface and illustrates an operation of one embodiment of the present invention.

FIG. 2 illustrates a GUI 200 of a generic relational modelling tool. The GUI 200 includes selectable interface entities 201 to 209, cursor 220, and toolbar 211.

In the generic relational modelling tool of FIG. 2, a relationship can be created between one or more of the selectable interface entities 201 to 209 by performing a drag-and-drop operation thereon. For example, a relationship between the selectable interface entity 201 and the selectable interface entity 206 can be realized by selecting the selectable interface entity 201, dragging the selectable interface entity 201 to the selectable interface entity 206, and dropping the selectable interface entity 201 onto the selectable interface entity 206. In the example of FIG. 2 however, not all selectable interface entities 201 to 209 can have a valid relationship with each other.

According to this embodiment, a user is informed of which of the selectable interface entities 201 to 209 can validly have a relationship with a selected interface entity by accentuating either the entities which can have a valid relationship, or accentuating the entities which cannot have a valid relationship, or accentuating both the entities which can have a relationship and those that cannot have a valid relationship in distinct manners, upon commencement of the drag-and-drop operation. An operation of this embodiment is described with reference to FIG. 3.

Figure 3:
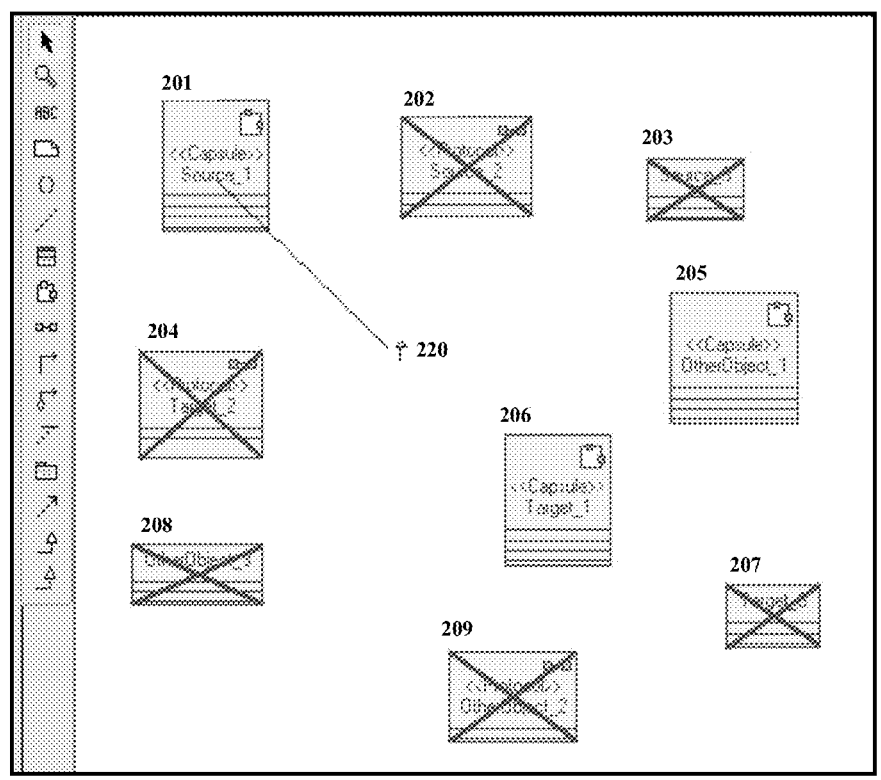
FIG. 3 represents the windows application of FIG. 2, further illustrating the operation of one embodiment of the present invention.

FIG. 3 illustrates the generic relational modelling tool of FIG. 2 following the commencement of a drag-and-drop operation. As shown in FIG. 3, the cursor 220 has been used to select the selectable interface entity 201, and has been dragged a short distance towards the bottom right corner of the window. At this point, the accentuating mechanism 125 detects the commencement of a manipulation operation, and generates a list of valid and invalid entities which may validly participate in the commenced manipulation operation, for example a drag-and-drop operation. As described above, not all selectable interface entities 202 to 209 can validly have a relationship with the selected interface entity 201. To inform the user of this fact, the entities are listed as not valid and hence cannot have a valid relationship with the selected interface entity 201, which in FIG. 3 are selectable interface entities 202 to 204 and 207 to 209, are accentuated. These selectable interface entities 202 to 204 and 207 to 209 comprise a first group of interface entities, which cannot have a valid relationship with the selected interface entity 201 and hence cannot validly participate in the commenced manipulation operation. In the example shown in FIG. 3, the first group of selectable interface entities, that is, selectable interface entities 202 to 204 and 207 to 209, are accentuated with a symbol such as a cross or check or the like.

Conversely, the entities listed as valid (or not listed as invalid), and which can hence have a valid relationship with the selected interface entity 201, which in FIG. 3 are selectable interface entities 205 and 206, are left un-accentuated. In this manner, it is conveyed to the user that only the selectable interface entities 205 and 206 are valid participants in the commenced manipulation operation. The selectable interface entities 205 and 206 comprise a second group of interface entities, which can have a valid relationship with the selectable interface entity 201 and hence can validly participate in the commenced manipulation operation. Although the present embodiment leaves selectable interface entities of the second group un-accentuated, it should be appreciated that the scope of this invention is not limited to the above. The selectable interface entities of the second group may also be accentuated, so long as they are rendered visually distinct from the selectable interface entities of the first group.

Second Embodiment

Figure 4:
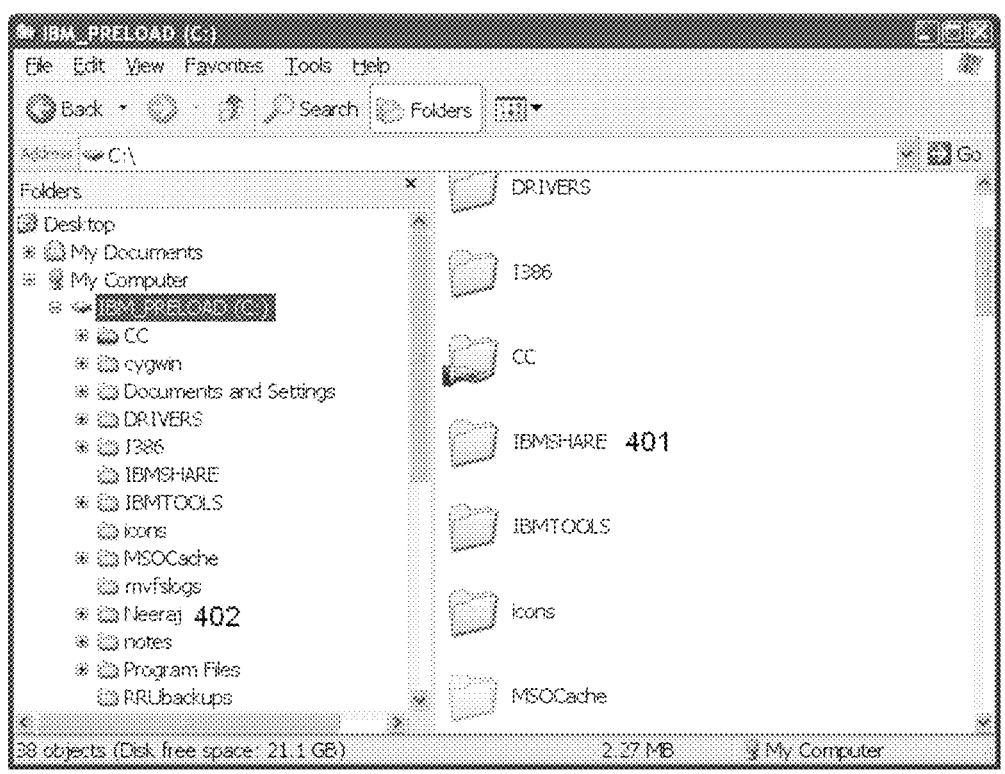
FIG. 4 represents a windows application with a graphical user interface and illustrates an operation of one embodiment of the present invention.

A second embodiment of this invention is disclosed with reference to FIG. 4. FIG. 4 depicts a graphical file manager 400 for performing operations on selectable interface entities such as files, folders, and devices of a computer system.

The graphical file manager 400 of FIG. 4 includes a folder 402 named "Neeraj", and a folder 401 named "IBMSHARE". An operation of the graphical file manager 400 in accordance with the second embodiment in described.

In FIG. 4, an attempt to move the folder 401 (IBMSHARE) to the folder 402 (Neeraj) is being attempted. This attempt is detected by the accentuating mechanism 125 as a commencement of a manipulation operation. In the example of FIG. 4, however, the folder 402 (Neeraj) has been set as read-only to the user, hence making a move operation on the folder 401 (IBMSHARE) to the folder 402 (Neeraj) by the user impossible. Accordingly, the folder 402 is listed by the validity checker sub-module 930 as an invalid entity in so far as participating in the commenced 'move' manipulation operation is concerned. The folder 402 (Neeraj) is hence accentuated by the accentuator sub-module 940 conveying to the user that the status/attribute of the folder 402 is read-only.

Figure 5:
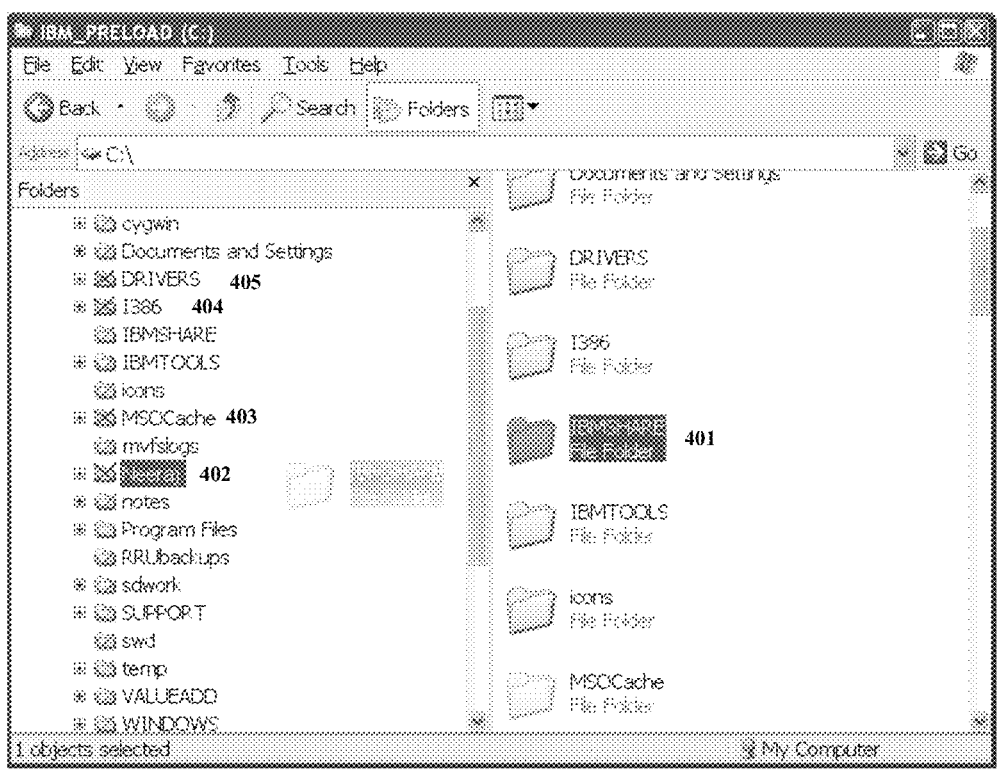
FIG. 5 represents the windows application of FIG. 4, further illustrating the operation of one embodiment of the present invention.
Figure 6:
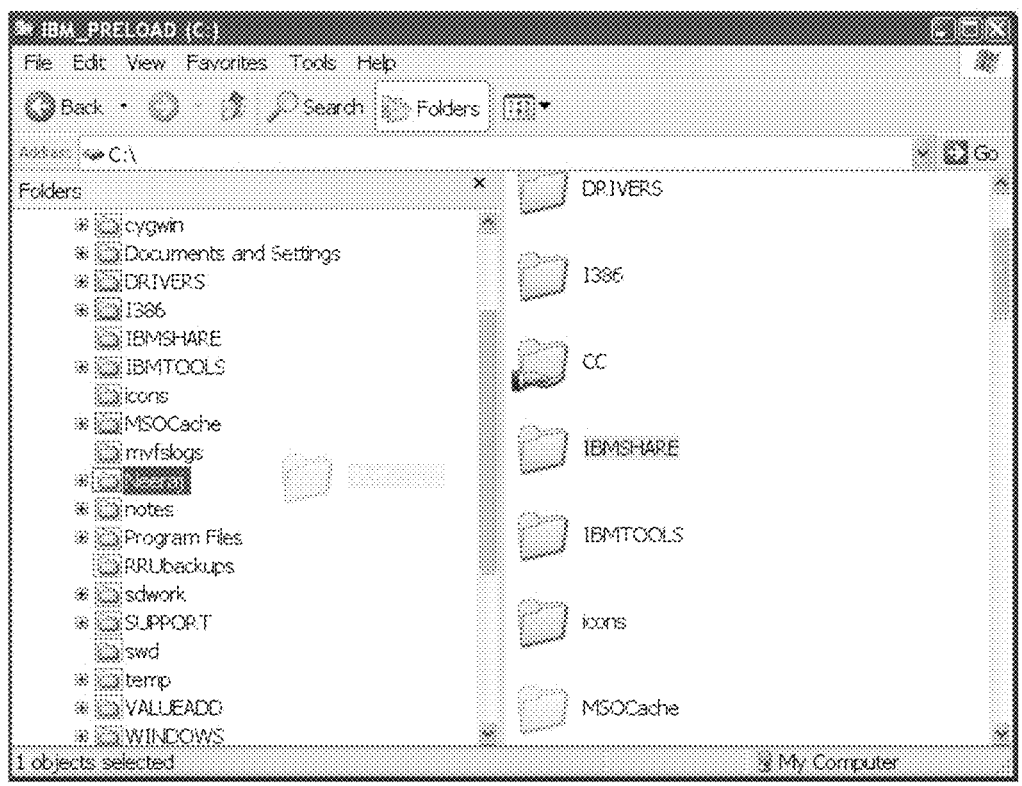
FIG. 6 represents the windows application of FIG. 4, still further illustrating the operation of one embodiment of the present invention.

As shown in FIG. 5, one way of conveying such information to the user is by accentuating the folder icon of the folder 402 (Neeraj) so as to display a symbol (e.g. a cross) indicating that the folder 402 (Neeraj) is not a valid participant of the commenced manipulation operation. Indeed, the graphical file manager of the present embodiment indicates to the user that the folders 403 (MSOCache), 404 (I386), and 405 (DRIVERS) are also not valid participants of the commenced manipulation operation (i.e. the drag-and-drop operation to move the folder 401 (IBMSHARE)).

Alternatively, borders surrounding the folder icon of the folder 402 (Neeraj) may be accentuated with a different border weight, border colour, or border pattern, and/or the name of the folder "Neeraj" may also be coloured distinct from those of folders which are valid participates of the commenced manipulation operation.

The different accentuation types may be stored separately from the accentuating mechanism 125 in a storage device internal to the computer system 100, such as for example a direct access storage device 155 and/or CD-RW 195, or a storage device external to the computer system 100 accessed via network interface 150. The DASD 155 may be directly coupled to a computer system 100 and/or indirectly coupled to the computer system 100 over a network 155. The network connectivity to the computer system 100 may be a wired means, a wireless means or a combination thereof. Preferably, the different accentuation types are stored in an indexed manner, to facilitate fast and efficient retrieval and/or pre-loaded into the main memory 120 of the computer system 100. The accentuator sub-module 940 refers to the appropriate storage location of the accentuation types to obtain or determine the appropriate accentuation to be applied. The second embodiment groups selectable interface entities into the first and second groups, depending on their relationship with the selectable interface entity upon which a manipulation operation has been commenced. Accentuation is then performed on entities of one (or both) groups such that the entities of one group are rendered visually distinct from those of the other group.

It is to be understood by a person skilled in the art that the manner in which entities of the GUI are accentuated is not limited to only those described in the above embodiments, Indeed, any number of accentuations, such as reverse-video, blinking, and the like, may be employed so long as they distinguish valid participants of a commenced manipulation operation from any non-valid participants. Further, accentuations may be applied either to the valid participants, or the invalid participants, or to both, so long as such accentuations distinguish one from the other. User customizable accentuations may be permitted by allowing new accentuations to be added.

Whilst the above embodiments are described with reference to operations that are most commonly effected by drag-and-drop operations, it should be apparent to a person skilled in the art that the scope of this invention is not limited to the drag-and-drop operation and may be applicable to any GUI-type manipulation operations such as resizing, re-naming, and batch selecting, and to other known GUI-type manipulation operations performed. Those skilled in the art will also appreciate that variations of the disclosed invention are possible within the scope of the present invention. Thus, while this invention has been particularly illustrated and described with reference to the above embodiments, it will be understood by those skilled in the art that modifications in form and details may be made thereto without departing from the spirit and scope of the invention, the embodiments being illustrative and not restrictive.

By accentuating entities of a graphical user interface according to this invention, user interfaces of display devices can be made more intuitive, and easier to use. An advantage is that the chances of executing manipulation operations in error, or executing manipulation operations that do not in fact perform any function, are substantially reduced. A further advantage is that, this invention when implemented in the complex and function-rich devices presently available, provides a graphical user interface allowing intuitive and accurate usage, thereby making it easier for new users to easily learn, and for existing users to efficiently use the device.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A non-transitory computer-readable medium having graphical user interface instructions stored thereon, that when executed manipulate entities by a manipulation operation, the computer-readable medium comprising:
a memory having instructions executable by a processor that implements a graphical user interface including:
a selectable interface entity upon which the manipulation operations are operable;
a first interface entity other than the selectable interface entity; and
a second interface entity other than the selectable interface entity and the first interface entity, wherein
upon commencement of a manipulation operation on the selectable interface entity, at least one of the first interface entity and the second interface entity is accentuated to indicate a relationship thereof with respect to the selectable interface entity and the commenced manipulation operation.

2. The graphical user interface of claim 1, wherein the first interface entity is an interface entity that can validly participate in the manipulation operation commenced on the selectable interface entity.

3. The graphical user interface of claim 2, wherein the first interface entity is accentuated to indicate that the first interface entity is a valid participant of the commenced manipulation operation.

4. The graphical user interface of claim 1, wherein the second interface entity is an interface entity that cannot validly participate in the manipulation operation commenced on the selectable interface entity.

5. The graphical user interface of claim 4, wherein the second interface entity is accentuated to indicate that the second interface entity is not a valid participant of the commenced manipulation operation.

6. The graphical user interface of claim 1, wherein
the first interface entity is an interface entity that can validly participate in the manipulation operation commenced on the selectable interface entity, and is accentuated as a valid participant of the commenced manipulation operation, and
the second interface entity is an interface entity that cannot validly participate in the manipulation operation commenced on the selectable interface entity, and is accentuated so as to be visually distinct from the first interface entity.

7. The graphical user interface of claim 3, wherein the first and second interface entities are represented as icons, and the first interface entity is accentuated such that the first interface entity is represented with an icon visually distinct to that of the second interface entity.

8. The graphical user interface of claim 5, wherein the first and second interface entities are represented as icons, and the second interface entity is accentuated such that the second interface entity is represented with an icon visually distinct to that of the first interface entity.

9. The graphical user interface of claim 3, wherein the first interface entity is accentuated such that a colour of the first interface entity is visually distinct to that of the second interface entity.

10. The graphical user interface of claim 5, wherein the second interface entity is accentuated such that a colour of the second interface entity is visually distinct to that of the first interface entity.

11. The graphical user interface of claim 1, wherein the commenced manipulation operation is a drag-and-drop operation.

12. A method of accentuating a graphical user interface for a display, the method comprising the steps of:
    detecting commencement of a manipulation operation on an entity of the graphical user interface;
    determining which entities out of a plurality of entities of the graphical user interface are valid participants in the detected manipulation operation; and
    accentuating the plurality of entities of the graphical user interface such that the entities which are valid participants are visually distinct from the entities which are not valid participants.

13. The method of claim 12, wherein accentuating the plurality of entities on the graphical user interface includes accentuating the entities which are valid participants.

14. The method of claim 12, wherein accentuating the plurality of entities on the graphical user interface includes accentuating the entities which are not valid participants.

15. The method of claim 12, wherein accentuating the plurality of entities on the graphical user interface accentuates the valid participants entities by a first accentuation, and accentuates the invalid participants entities by a second accentuation, the first accentuation being visually distinct from the second accentuation.

16. A non-transitory computer program product for accentuating a graphical user interface for a display, the computer program product comprising:
    code for detecting when a manipulation operation is commenced on an entity of the graphical user interface;
    code for determining which entities out of a plurality of entities of the graphical user interface are valid participants in the detected manipulation operation; and
    code for accentuating the plurality of entities of the graphical user interface such that the entities which are valid participants are visually distinct from the entities which are not valid participants.

17. The computer program product of claim 16, wherein the code for accentuating accentuates valid participants.

18. The computer program product of claim 16, wherein the code for accentuating accentuates non-valid participants.

19. The computer program product of claim 16, wherein the code for accentuating accentuates valid participating entities by a first accentuation, and non-valid participating entities by a second accentuation, the first accentuation being visually distinct from the second accentuation.

* * * * *